Sept. 2, 1952  J. F. NAYLOR  2,608,939
DOUGH MOLDING DEVICE
Filed May 10, 1948
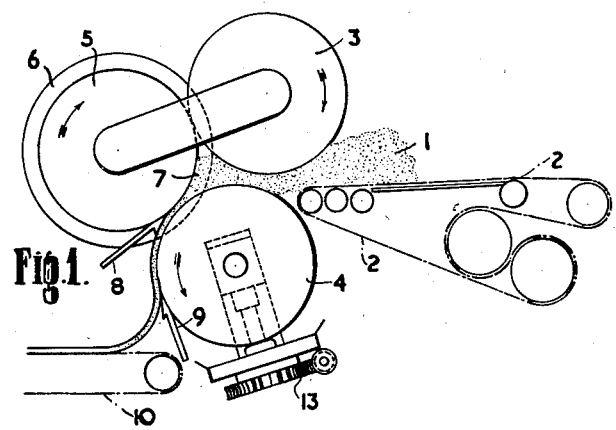
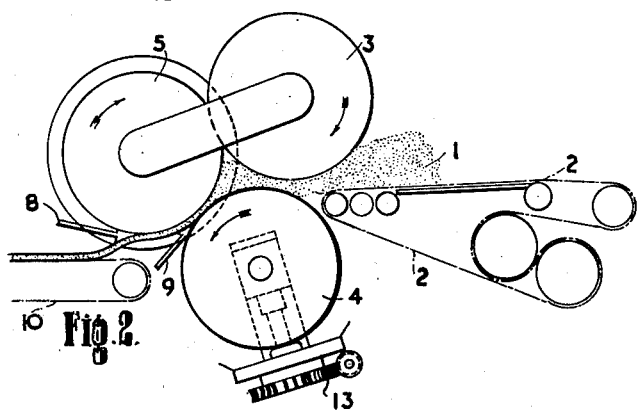
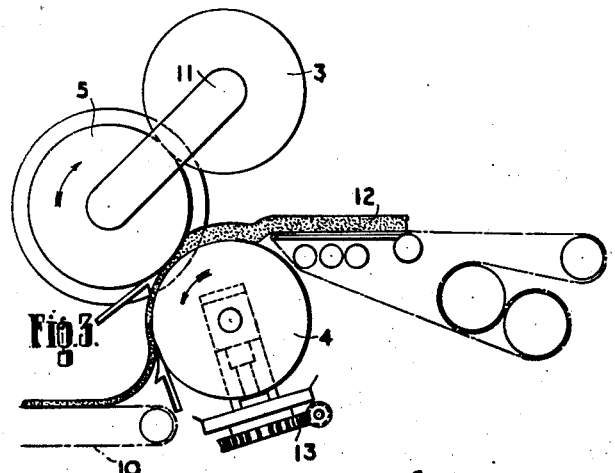
Joseph Francis Naylor
INVENTOR
BY
S. Victor Armstrong ATTORNEY Patented Sept. 2, 1952

2,608,939

UNITED STATES PATENT OFFICE 2,608,939

DOUGH MOLDING DEVICE

Joseph Francis Naylor, Newton-le-Willows, England, assignor to T. & T. Vicars Limited, Earlestown, Newton-le-Willows, England, a British company Application May 10, 1948, Serial No. 26,176
In Great Britain November 19, 1947

2 Claims. (Cl. 107—12)

The present invention relates to improvements in devices for the moulding of baker's dough and the like plastic material.

Dough moulding machines are known where three rollers are grouped on parallel axes, two rollers being spaced apart and rotating in opposite directions of rotation to take up dough from a superimposed hopper, this dough being then compressed into the spherical triangular cross-sectioned space between these two spaced rollers and a third lower roller, the dough emerging as a continuous sheet from between one of the said spaced rollers and the said third roller. In such machines two of the rollers have usually had a plain surface whilst the other has been grooved, the spacing of the rollers being adjustable according to the desired degree of compression of the dough and for the thickness of the final sheet.

Such known arrangements necessitate a high position of the feed hopper, often therefore requiring means to lift the dough supply from a lower level to the hopper.

An object of the present invention is to reduce the overall height of the machine and to facilitate feeding.

According to the present invention a pair of rollers rotating in the same direction of rotation are disposed in spaced relationship with a third roller lying on a parallel axis disposed below the axes of the first two rollers, this third roller rotating in the opposite direction to the pair of rollers above it, and means being provided to feed dough to the bight between this lower roller and one of the upper rollers.

It will consequently be seen that the overall height of the machine can be very considerably reduced, and by providing means to displace one of the upper rollers away from the lower roller, the machine can be converted to a dough gauging machine.

Means may further be provided to adjust the space between either of the top rollers and the lower roller.

One of the top rollers will preferably be provided with a plain surface and have side flanges, whilst the other roller, which will be the entry roller of the bight, will have a grooved surface.

The lower roller will usually be plain and adjustable to control the final thickness of the sheet delivered.

The invention is further described with reference to the accompanying diagrammatic drawings, in which:

Fig. 1 is a side elevation of one form of construction of machine,

Fig. 2 is a similar view of an alternative form of machine,

Fig. 3 is a similar view of another form of machine.

Plastic material 1, such as baker's dough, is fed by a continuously moving endless belt conveyor 2 to the bight between a rotating grooved roller 3 and a smooth rotating roller 4, which rollers are disposed as shown at different vertical heights. The rollers 3, 4, are grouped with another smooth roller 5 having end flanges 6 to form a compression space 7 for the dough. The dough, after having been compressed in the space 7, emerges as a continuous sheet between the rollers 4, 5 and in the arrangement of Fig. 1 is first stripped by a scraper or blade 8, having a concave surface, from the roller 5 and then later stripped from adhesion with the roller 4 by a blade or knife 9, also having a concave surface, to fall upon a continuous belt conveyor 10 by which it is conveyed to any desired point.

As shown in Fig. 2, the dough leaving the outlet gap between the rollers 4, 5, may be first stripped from the roller 4 and then later stripped from adhesion to the roller 5 by suitable readjustment of position of the knives or scrapers 8, 9.

By arranging that the roller 3 is adjustable away from the roller 4, as for instance by mounting it on links 11 rotatable about the axis of the roller 5, it may be swung up into a position as shown in Fig. 3, so that the apparatus, instead of being used as a means for forming a sheet of dough from plastic material, may be used as a gauging machine, that is to say to reduce the thickness of a preformed continuous sheet of dough such as 12, Fig. 3, in which case the dough is acted upon solely by the rollers 4, 5, and it may, of course, be stripped either first from the roller 5 and then subsequently from the roller 4, or vice versa, to fall upon the travelling conveyor 10 for conveyance to a remote place, as, for instance, directly to a biscuit cutting device.

If desired, the conveyor 10 may be arranged to be displaceable from the position shown in Fig. 1 to the position shown in Fig. 2.

Further, means such as a worm and worm wheel arrangement 13 may be provided for adjusting the spacing of the roller 4 from the roller 5.

The rollers 4, 5 are preferably disposed as shown, with their axes lying in a plane at an angle to the horizontal.

I declare that what I claim is:

1. A machine for the formation of a continuous sheet from a plastic dough material including, in combination, first and second rollers having parallel axes lying in a common plane, said rollers being adapted to rotate in the same direction, the peripheries of said rollers being in proximate relation to each other, said second roller being movable through an arc centered on the axis of said first roller into operative position; a third roller having an axis parallel to the axes of said first and second rollers and disposed below said axes, said third roller adapted to rotate in a direction opposite the direction of rotation of said first and second rollers, said third roller being in spaced relation to said first roller to form a bight therebetween, means associated with said third roller for adjusting said bight; and means to continuously feed dough material in a substantially horizontal direction into said bight for compression into a sheet.

2. A machine as claimed in claim 1 wherein the axis of said third roller is adjustable in a direction eccentric to said first roller.

JOSEPH FRANCIS NAYLOR.

REFERENCES CITED

The following references are of record in the file of this patent:

UNITED STATES PATENTS

| Number | Name | Date |
|---|---|---|
| 1,270,096 | Baker | June 18, 1918 |
| 1,830,426 | Crosland | Nov. 3, 1931 |
| 1,965,779 | Mercier | July 10, 1934 |
| 2,034,346 | Lauterbur | Mar. 17, 1936 |
| 2,159,044 | Paterson | May 23, 1939 |

FOREIGN PATENTS

| Number | Country | Date |
|---|---|---|
| 37,067 | Norway | Apr. 3, 1923 |
| 321,403 | Great Britain | Nov. 4, 1929 |